United States Patent [19]

Morford

[11] Patent Number: 4,565,385

[45] Date of Patent: Jan. 21, 1986

[54] TILTABLE SUPPORTING WHEELCHAIR

[76] Inventor: Marvin A. Morford, 1815 Ashworth Rd., West Des Moines, Iowa 50265

[21] Appl. No.: 570,977

[22] Filed: Jan. 16, 1984

[51] Int. Cl.[4] .................................... B62B 11/00

[52] U.S. Cl. .................... 280/289 WC; 280/242 WC; 297/DIG. 4

[58] Field of Search ................ 280/242 WC, 289 WC, 280/657, 30, 47.38, 47.4, 47.41, 43, 43.1; 297/DIG. 4, 270, 347

[56] References Cited

U.S. PATENT DOCUMENTS

| | | | |
|---|---|---|---|
| 1,241,357 | 9/1917 | Drosdowet | 297/270 |
| 2,150,441 | 3/1939 | Harris | 280/43.1 |
| 2,601,889 | 7/1952 | Everest et al. | 297/DIG. 4 |
| 3,189,384 | 6/1965 | Bliss | 297/DIG. 4 |
| 3,674,310 | 7/1972 | Montagano | 280/242 WC |
| 3,848,883 | 11/1974 | Breacain | 280/242 WC |

FOREIGN PATENT DOCUMENTS

| | | | |
|---|---|---|---|
| 2150525 | 4/1972 | Fed. Rep. of Germany | 297/DIG. 4 |
| 889897 | 2/1962 | United Kingdom | 297/270 |

*Primary Examiner*—Joseph F. Peters, Jr.
*Assistant Examiner*—Charles R. Watts
*Attorney, Agent, or Firm*—James D. Birkenholz

[57] ABSTRACT

A tiltable supporting wheel chair having a tilting mechanism with front support wheels which pivot downward and outward engaging the floor and raising the front of the wheelchair and tilting it backwards. The tilting mechanism further includes a cross-frame pivotably attached to the frame of the wheelchair and activated by movement of an arm attached to it. The arm is controlled by a rod leading to a pivotal plate which is connected to a lever on the side of the wheelchair by a linkage. Upon movement of the lever, the linkage rotates the plate, moving the arm and cross-frame to extend or retract the front wheels. A locking mechanism prevents accidental movement of the level. Rear supports extend behind the wheelchair and engage the floor upon the front wheels being pivoted to their furthest point forward. An adjustable leg support includes a leg pad slidably mounted on a cross-frame which is pivotly mounted to the frame with a locking rod engaging a locking plate for controlled pivotal movement of the cross-frame. A spring latch engages supports of the cross-frame to allow the pad to lockingly slide along the length of the cross-frame. A head rest is provided which includes a heat support secured to the back support of the chair with a head cushion adjustably mounted thereon.

5 Claims, 11 Drawing Figures

TILTABLE SUPPORTING WHEELCHAIR

BACKGROUND OF THE INVENTION

1. Field of the Invention

The present invention relates generally to wheelchair and more particularly to a tiltable wheelchair having a head rest and an adjustable leg support while still providing mobility in a reclined position.

2. Description of the Prior Art

The art of the wheelchair for usage by injured and infirm people is well known. Classically, the wheelchair was designed and developed to transport a person from one location to another as contrasted with the use of a stretcher. However, as health care evolved to be more specialized, the wheelchair has become a very common and indispensable instrument. The actual function of the wheelchair has changed from that of a traditionally transporting device to a holding device for patients and infirm people who ultimately spend a great deal of time confined to the wheelchair. Examples of such usage would be in skilled care and conventional nursing home facilties. Typically, a patient in such facilities is placed in the wheelchair upon rising in the morning and removed only for brief periods of time until again placed in their bed at night. The wheelchair is not designed for much extended holding in that typically it provides only upright sitting with the occupant's legs extending straight down in front of the occupant with little or no support for the shoulders and head. Typically, flexion deformity results with the patient assuming a posture of forward slump, resting the head over the knees or over the side of the wheelchair.

The present art of wheelchair development to lessen the aforesaid problem includes means to permit the chair itself to rock as disclosed in Kiel, U.S. Pat. No. 4,125,269 and Vaughan, U.S. Pat. No. 4,118,046. However, rocking motion may often not be desired and may be impractical where the patient is not physically able to provide the rocking motion force necessary to continually move the chair. Further, the absolute stability of the chair when occupied by an elderly person, who through inadvertance may obtain undesired and unpredictable movement of a rocking chair cannot be subject of concern when occupants are left unattended. Further, the rocking type chairs are in a fixed location when the rocker is engaged, thus at the least providing a monotonous environment and potentially a serious safety hazard, thorugh their inability to move in an emergency.

There is a need for a safety wheelchair which is adapted to hold an individual for extended periods of time, for when relief from the traditional upright sitting position may be given, while still permitting their mobility.

SUMMARY OF THE INVENTION

The present invention provides a tiltable supporting wheelchair through the addition of a tilting mechanism and a leg support and a head rest on a conventional wheelchair. The tilting mechanism includes front support wheels pivotally connected to the frame of the wheelchair by a pivotal cross-frame by brackets attached to the wheelchair. The cross-frame is connected via an arm and rod to a pivotal plate which is connected by a linkage to a lever which is pivotly connected to the back of the wheelchair frame and pivots from an upper retracted position where the front wheels are retracted to a lower tilted position where the front wheels are pivoted forward and downward to engage the floor and raise the front of the wheelchair. Rear supports contact the floor upon the front wheels pivoting to their farthest point. A locking plate and pin prevent free movement of the lever between the upper retracted position and the lower extended-tilted position.

The adjustable leg support includes a leg pad slideably mounted on a cross-frame pivotally connected to the front of the frame of the wheelchair. A notched locking plate secured to the cross-frame engages a locking rod to selectively control the pivotal movement of the cross-frame from a non-serviceable down position to a selective pivotable upward position extending outward from the front of the wheelchair. A spring accented latch engages cross-frame supports to allow sliding of the pad along the length of the cross-frame.

A head rest is provided by a head support secured by a bracket to the back support of the wheelchair with a height adjustable head cushion mounted thereon.

DESCRIPTION OF THE DRAWINGS

FIG. one is a side view of a conventional wheelchair illustrating the tilting means of the present invention, with the wheelchair in a normal position and the leg rest moveable upwards and outwards.

DESCRIPTION OF THE PREFERRED EMBODIMENT

Figure 1:
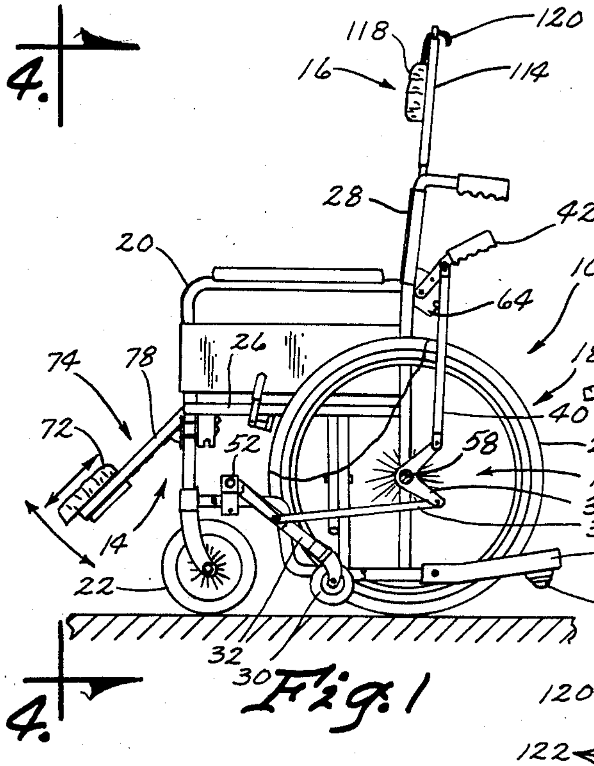
Figure 2:
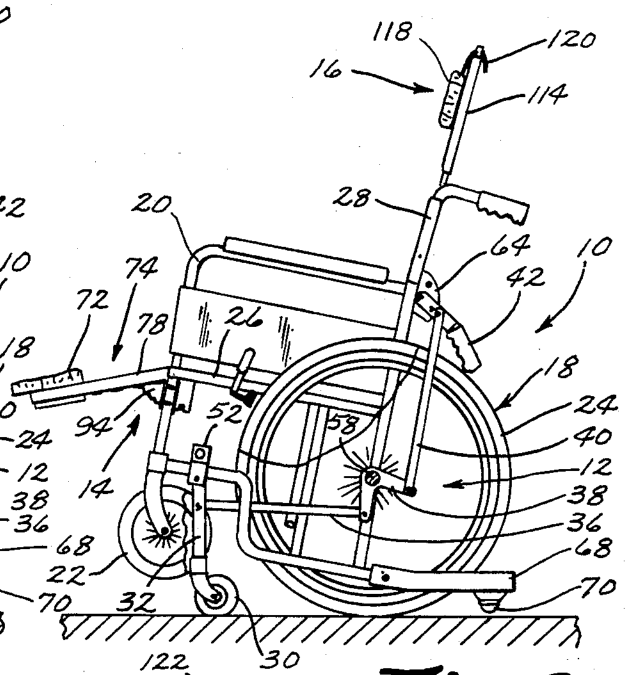
FIG. 2 is a side view of the wheelchair of FIG. 1 with the tilting means of the present invention engaged and the leg rest raised and extended.
Figure 3:
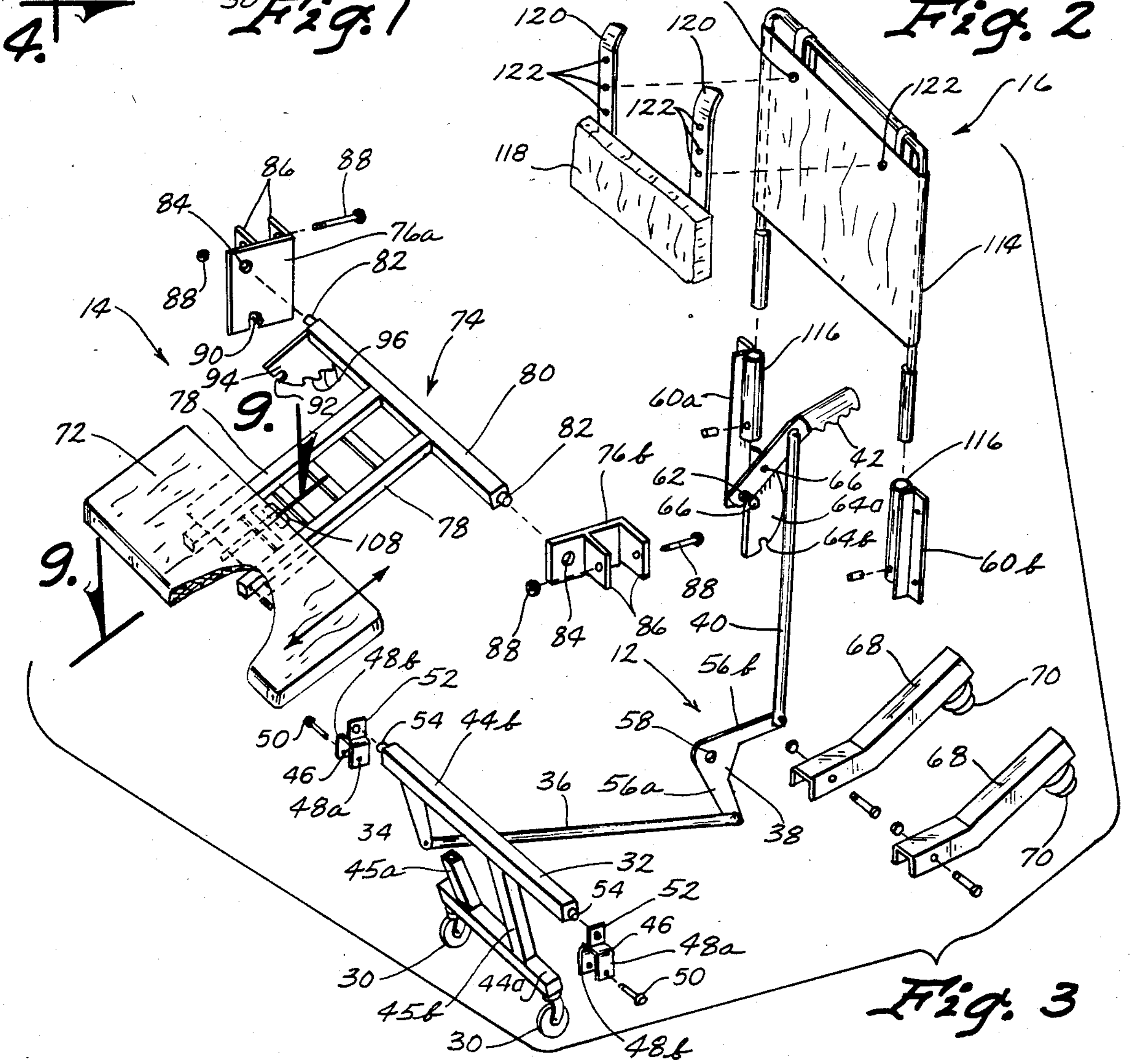
FIG. 3 is a perspective exploded view of the tilting means and leg rest.
Figure 4:
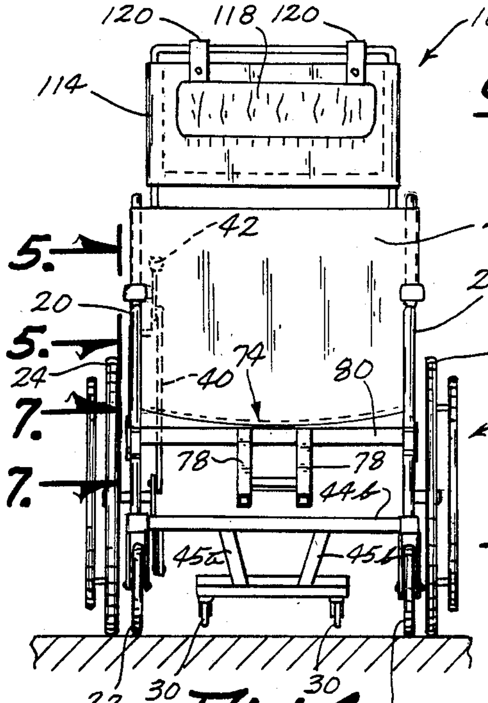
FIG. 4 is a front view of the wheelchair taken along lines 4—4 of FIG. 1.
Figure 5:
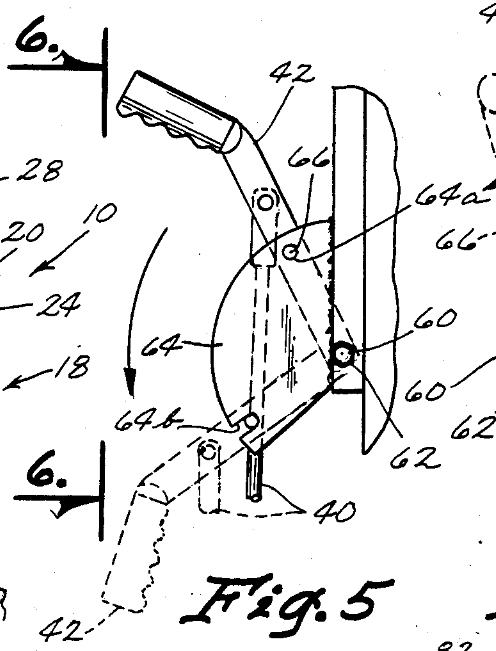
FIG. 5 is an enlarged detailed view of the lever assembly taken along lines 5—5 of FIG. 4.
Figure 6:
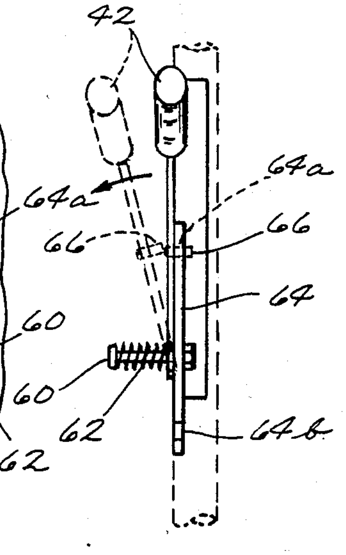
FIG. 6 is taken along lines 6—6 of FIG. 5.

Referring now to the drawings, wherein like reference numerials designate identical or corresponding parts throughtout the several views, the tiltable supporting wheelchair of the present invention is illustrated generally at 10 in FIG. 1.

Generally, the tilting wheelchair 10 (FIGS. 1–5) includes a tilting mechanism 12, an adjustable leg support 14 and a head rest 16 all mounted on a conventional wheelchair 18. The wheelchair 18 is of a type which typically includes a rigid frame 20 with the usual spaced apart set of front and rear wheels 22 and 24 respectively with a seat 26 spaced therebetween and a back rest 28 extending upward therefrom.

Specifically, the tilting mechanism 12 (FIGS. 1–6) includes front support wheels 30 mounted on a cross-frame 32 with an arm 34 extending downward therefrom connected by a rod 36 to a pivoting plate 38 which is connected by a linkage 40 to a lever 42. The wheels 30 are spaced apart for stability of the wheelchair 18 and of conventional type capable of carrying the front weight of the chair 18 and pivotably secured to the cross-frame 32 permitting them to rotate about their verticle axis when in contact with the floor. The cross-frame 32 includes two spaced horizontal members 44*a* and *b* and two spaced vertical members 45*a* and *b*. The upper member 44*b* is pivotally connected to the frame 20 of the wheelchair 18 by brackets 46 which include two arms 48*a* and *b* which slip over the frame 20 and secured thereto by a conventional nut-bolt 50 compressing the arms 48 against the frame 20 and a receiving arm 52 into which a peg 54 on each end of the cross member 44*b* slips and permits free pivotal movement of the cross frame 32. The arm 34 is rigidly secured to the upper cross member 44*b* and extends downward therefrom. The rod 36 is moveably connected at one end near the bottom of the arm 34 and to the pivotal plate 38 at its other end. The plate 38 is securely pivotably connected to the frame 20 and forms an approximate right angle having a first leg 56*a* and second leg 56*b* extending together about the point of pivoting 58. The linkage 40 is moveably connected at one end to leg 56*b* and at its other end to lever 42. The lever 42 is moveably connected to the frame 20 by a nut-bolt assembly 60 with a push spring 62 on the inside of the lever 42, holding the lever 42 outward and preventing it from tilting inward toward the center of the chair. A plate 64 is rigidly secured to the frame 20 by a reinforcing strip 60*a* along side the lever 42 and includes two notches 64*a* and *b* cut from its outer edge. A rod 66 extends outward from the lever 42 and slips into a respective hole 64*a* and 64*b*. The lever 42 is pushed inward toward the center of the chair 18 to disengage the rod 66 from one of the notches 64*a/b* of the plate 64 and permit the lever 42 to move. A rear frame 68 extends behind the chair 18 and includes rear wheels 70. The wheels 70 are of a bearing type which provide full 360 degrees movement.

Figure 7:
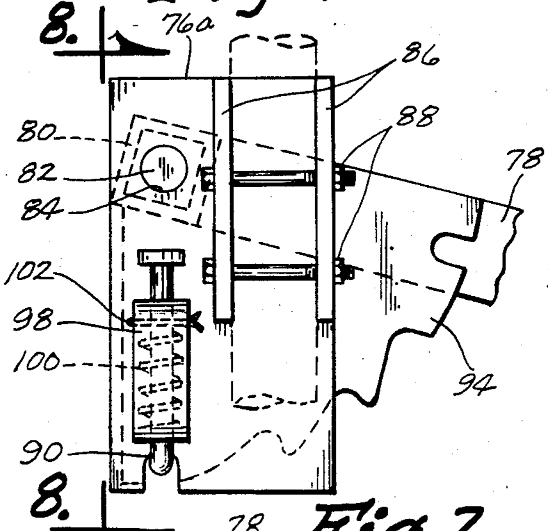
FIG. 7 is an enlarged cut away sectional detailed view of the cross-member assembly of the leg support taken along lines 7—7 of FIG. 4.
Figure 8:
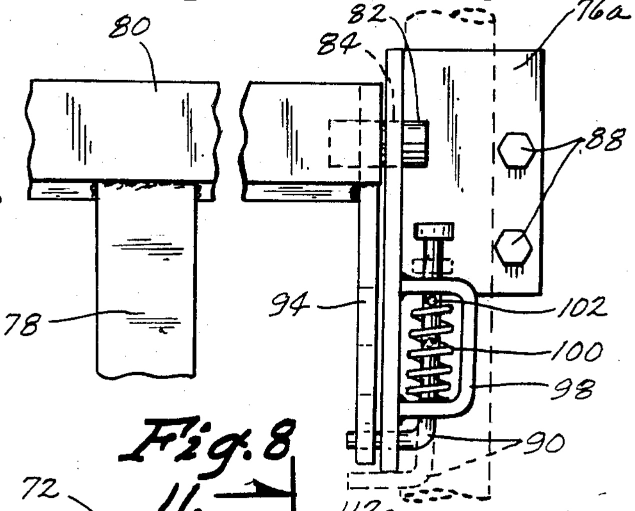
FIG. 8 is taken along lines 8—8 of FIG. 7.
Figure 9:
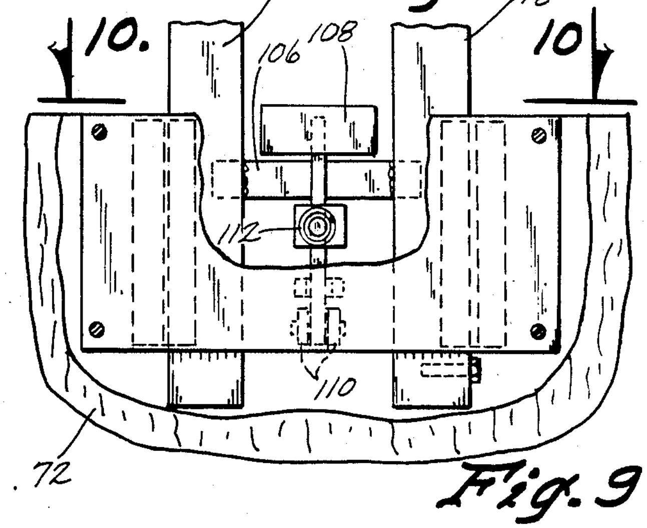
FIG. 9 is an enlarged cut away view taken along lines 9—9 of FIG. 3.
Figure 10:
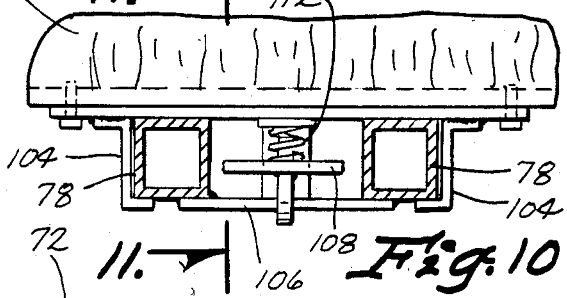
FIG. 10 is a cross sectional view taken along lines 10—10 of FIG. 9.
Figure 11:
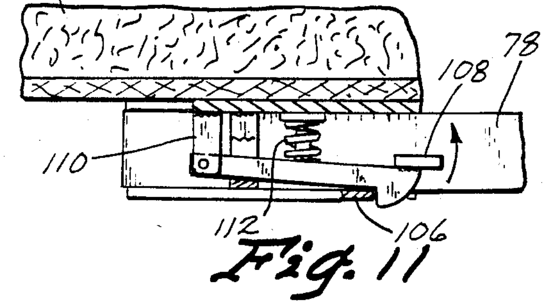
FIG. 11 is a cross sectional view taken along lines 11—11 of FIG. 10.

The adjustable leg support 14 (FIGS. 1–4, 7–11) includes a leg pad 72 mounted on a cross frame 74 which is pivotally mounted on the frame 20 by brackets 76*a* and 76*b*. The cross frame 74 includes a pair of parallel members 78 with a cross member 80 extending over their upper end. The cross member 80 extends to the brackets 76*a* and 76*b* and includes pegs 82 which sets in a hole 84 of the brackets 76*a* and 76*b* and about which the cross frame 74 rotates. The brackets 46*a* and 46*b* are secured to the frame 20 beneath the seat 26 by arms 86 which extend along two sides of sections of frame 20 with a nut-bolt assembly 88 passing through and tightened to compress the arms 86 against the section of frame 20. The bracket 76*a* further includes a locking rod 90 extended through a slot 92 in the bottom of bracket 76*a* to engage a plate 94. The plate 94 is generally quarter circular in shape with teeth 96 extending from its bottom edge and is securely mounted on the cross member 80 adjacent the bracket 76*a*. A portion of the rod 90 extending through the bracket 76*a* engages the plate 94 between the teeth 96. The rod 90 further extends through a holder 98 and engages a push spring 100 via pin 102 (FIG. 7–8) which normally maintain the rod 90 in an up position illustrated by the solid line of rod 90 in FIG. 8 and upon pushing the rod 90 downward, to a bottom position illustrated by the dashed lines of rod 90 in FIG. 8, permitting the plate 94 to move past the rod 90, thus rotating the cross frame 74 (FIGS. 7–8) between a vertical and selective horizontal position for usage.

The leg support pad 72 (FIG. 10) is held in place by channel support rails 104 which overlay the parallel member 78 and permit the pad 72 to slide along the length of member 78. Supports 106 extend perpendicular to the members 78 and are engaged by lever 108. The lever 108 is attached to the bottom surface of pad 72 via a bracket 110. A push spring 112 exerts an outward force on the lever 108 to maintain engagement of the lever 108 and supports 106.

The head rest 16 (FIGS. 1–3) includes a head frame 114 which is secured to the back rest 28 of the chair 18 via brackets 116 which are secured to the frame 20 by reinforcing strips 60*a* and 60*b*. The brackets 116 receive a section of the head frame 114. A head cushion 118 is adjustably set on the head support by straps 120 utilizing compression snaps 122 to hold the strips in place.

As can be readily seen and appreciated, the tiltable wheelchair 10 is operated through manually sliding the lever 42 free of its upper locked position and pushing downward, thus pivoting the plate 38 via movement of linkage 40 and resulting in forward movement of rod 36, rotating the arm 34. The cross frame 32 pivots downward and forward with the wheels 30 engaging the floor. The continued forward movement of the cross frame 32 lifts the front of the chair 18 off the floor, tilting it with the wheels 70 engaging the floor at the end of movement of the frame 32. The stable supporting structure includes two side main wheels 24 as well as the wheels 30 and 70. Physical movement of the chair 18 by the occupant is as free as when the chair 18 is in the normal upright position, with the center of gravity being slightly shifted backward to be directly over wheels 24, providing increased stability and resistance to upset. Further, the leg support 14 is adjustable both in terms of angle of inclination with respect to the chair and the position of the pad 72 to conform to the needs of the occupant upon tilting of the chair 18. Further the leg support 14 operates independently of the tilting mechanism 12, to permit utilization even when the chair 18 is not tilted.

Obviously, many modifications and variations of the present invention are possible in light of the above teachings. It is therefore to be understood that, within the scope of the appended claims, the invention may be practiced otherwise than as specifically described.

I claim:

1. A tiltable supporting wheelchair mechanism mounted on a conventional wheelchair, the wheelchair having a frame with a seat, back support and two front spaced wheels and two rear spaced wheels, comprising:

a tilting mechanism means for the controllable raising of the front of the wheelchair above the floor, said means having a pair of front support wheels and a cross frame structure, the cross frame structure being pivotally mounted at one end to the frame of the wheelchair and to the front support wheels at its opposite end and pivotally connected to a lever, the lever attached to the wheelchair and moveable to cause the pivotal movement of the cross frame from a retracted position to an extended position wherein in the extended position, the front of the wheelchair is lifted off the floor by the support wheels contacting the floor; rear supports, said supports connected to the frame of the wheelchair and extend rearwardly from the frame to contact the floor upon the operation of the tilting mechanism in raising the front of the wheelchair to its highest point above the floor;

a leg support means for the selective supporting of an occupant's legs, the leg support means being mounted on the frame of the wheelchair and includes a leg pad mounted on a cross frame, the cross frame being pivotally mounted to the frame of the wheelchair and selectively pivotal between a vertical and horizontal position;

a head rest, the head rest mounted to the wheelchair and includes a head support, the head support being secured to the back support of the wheelchair.

2. A tiltable supporting wheelchair as defined in claim 1 wherein the tilting mechanism further includes the lever being connected to the cross frame by an arm, the arm being directly connected to the cross frame and to one end of a pivotal plate, the plate being secured to the frame of the wheelchair and a rod connected to the opposite end of the pivotal plate extending to the lever, whereby activation of the lever moves the rod to pivot the plate to move the arm attached to the cross member and extending or retracting the cross member.

3. A tiltable supporting wheelchair as defined in claim 1 wherein the tilting mechanism means further includes a locking device for securing the lever in a predetermined position.

4. A tiltable supporting wheelchair as defined in claim 1 wherein the leg support means includes a leg pad which is suitably adjustable along its cross frame.

5. A tiltable supporting wheelchair as defined in claim 1 wherein the head rest is adjustably mounted on the head support.

* * * * *